United States Patent [19]

Jagannadh et al.

[11] Patent Number: 5,238,538
[45] Date of Patent: Aug. 24, 1993

[54] METHOD FOR DEINKING RECYCLED FIBER BY APPLYING DIRECT CURRENT ELECTRIC FIELD

[75] Inventors: Satyavolu V. S. N. Jagannadh, Atlanta; Jeffery S. Hsieh, Marietta, both of Ga.

[73] Assignee: Georgia Tech Research Corporation, Atlanta, Ga.

[21] Appl. No.: 797,689

[22] Filed: Nov. 25, 1991

[51] Int. Cl.$^5$ .............................................. D21B 1/08
[52] U.S. Cl. .................................... 162/4; 162/6; 162/50; 162/192; 204/132; 204/133
[58] Field of Search ................. 162/4, 5, 6, 50, 55, 162/192; 204/132, 134, 133

[56] References Cited

U.S. PATENT DOCUMENTS

| | | | |
|---|---|---|---|
| 366,557 | 7/1887 | Brown . | |
| 747,234 | 12/1903 | Ruthenburg | 204/133 |
| 1,008,779 | 11/1911 | Bonser John | 204/132 |
| 2,743,178 | 4/1950 | Krodel et al. | 82/1.5 |
| 3,497,419 | 2/1970 | Winer et al. | 162/192 |
| 3,835,006 | 7/1972 | Fujita et al. | 204/180 R |
| 4,451,331 | 5/1984 | Raggam et al. | 162/18 |
| 4,548,674 | 10/1985 | Nanda et al. | 162/4 |
| 4,548,674 | 10/1985 | Hageman et al. | 162/5 |
| 4,586,982 | 5/1986 | Poppel et al. | 162/6 |
| 4,915,846 | 4/1990 | Thomas, Jr. et al. | 204/134 |

OTHER PUBLICATIONS

Zabala et al. "Drinking at Paelera Peninsular & the Philosphy of Deinking System Design", Aug,. 1988, Tappi J. pp. 62-67.

Primary Examiner—Peter Chin
Assistant Examiner—Dean Tan Nguyen
Attorney, Agent, or Firm—Deveau, Colton & Marquis

[57] ABSTRACT

A method for the deinking of recycled fibers, in which the macerated fibers are slurried with water; introduced to a deinking cell which has a central anode and a perimetal cathode; subjected to a direct current electric field applied between the anode and the cathode, causing the ink to be attracted away from the fibers and to electrocoagulate the ink then floating to the surface of the slurry with the aid of gas bubbles generated during the application of the electric field; and washed to recover a cleaner, brighter pulp of recycled fibers.

15 Claims, 5 Drawing Sheets

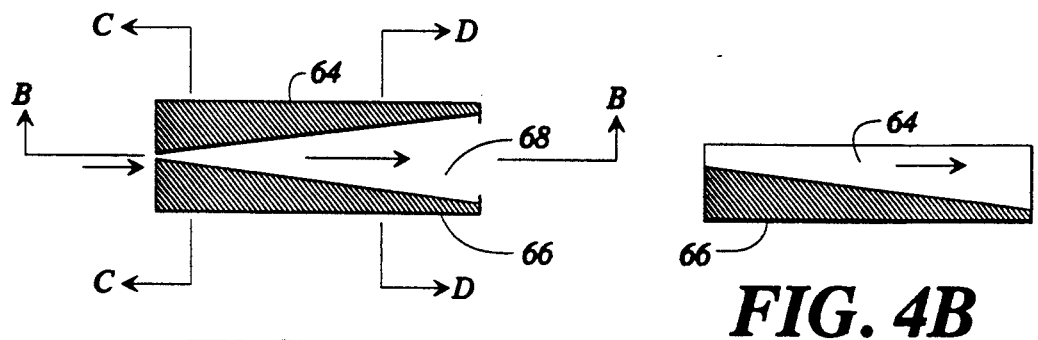
FIG. 4A   FIG. 4B
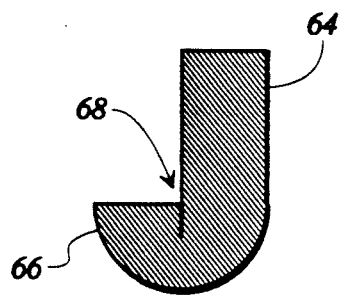   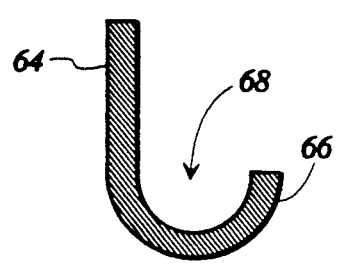
FIG. 4C   FIG. 4D
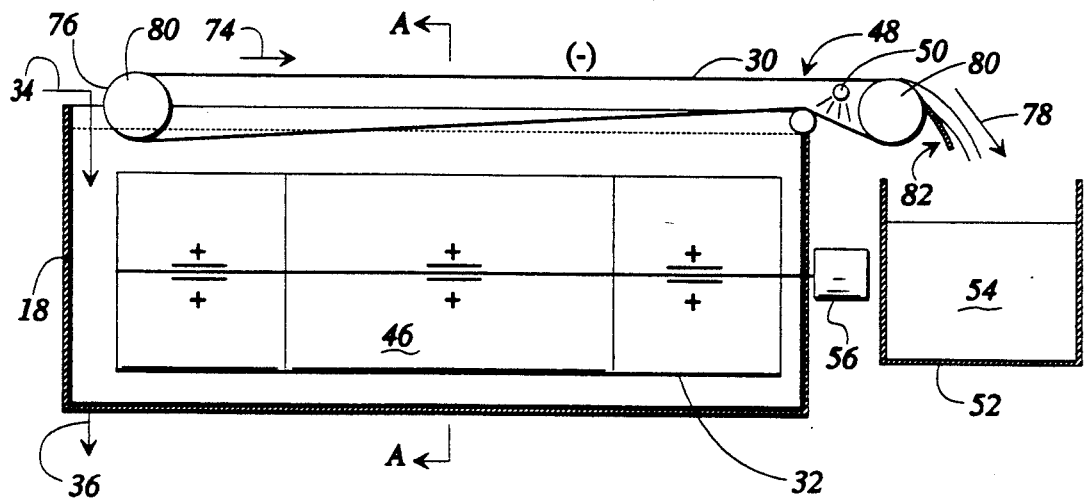
FIG. 5A

METHOD FOR DEINKING RECYCLED FIBER BY APPLYING DIRECT CURRENT ELECTRIC FIELD

BACKGROUND OF THE INVENTION

1. Field of the Invention

This invention is related generally to a method and apparatus for the separation and removal of ink from recycled fiber, and specifically to a method and apparatus which incorporates deinking, flotation, and bleaching and/or brightening operations, in a single stage by using a direct current (DC) electric field to induce electrophoresis and electrocoagulation to achieve better removal and separation of ink from the fibers, typically fiberized or pulped waste paper, and to provide better brightness and whiteness to the resulting pulp.

2. Prior Art

Deinking or ink removal is one of the key operations during fiber recycling, such as waste paper recycling. In a normal recycling operation, waste paper is fiberized in a hydrapulper in the presence of chemicals. The ink particles, dislodged or released from the fiber surfaces due to mechanical and/or chemical action, then are separated from the fiber slurry by means of a series of dispersion, flotation and/or washing steps, and other methods. To facilitate the complete removal of ink particles, more than one mechanical stage, including for example dispersion, flotation, washing, or other methods, typically are employed, or the ink particles are reduced mechanically or chemically to a smaller size such that they are not visible to the naked eye. Any other ink particles remaining in the pulp stock appear as specks in a paper sheet.

The several mechanical and chemical treatments incorporated in recycling processes further reduce the strength properties of fiber. To restore the fiber strength, additional chemical treatments typically are employed. All of these operations add to the cost of recycling and make recycling uneconomical compared to virgin paper making. Thus, there is a need for a technology that can accomplish deinking in a fewer number of mechanical and chemical stages so as to reduce fiber destruction and decrease cost, while maintaining the fiber properties at desirable levels. Therefore, more efficient means, preferably non-chemical and non-mechanical, are needed to reduce the number of repetitions and thereby retaining the strength properties of the fibers.

The use of an electric field to loosen foreign matter from and to cause the bleaching of fibers is known in the art. Brown, U.S. Pat. No. 366,557, discloses the use of an electric current to loosen any glutenous or any other foreign matter that may adhere to fibrous material such as ramie, pita, yucca, and other fibrous plants or materials for textile or other uses. However, the Brown process is geared toward the initial processing and cleaning of fibrous materials such that they may be further processed for textile or other uses, and does not disclose a method of removing ink and bleaching and/or brightening recycled fiber for reconstituting purposes. Ruthenberg, U.S. Pat. No. 747,234, discloses a method for bleaching paper pulp by applying an electric field across a paper pulp and chemical mixture. The Ruthenberg process adds a conductivity increasing chemical, such as calcium oxide, and uses the electrolytic decomposition of a chemical, such as sodium chloride, to create a bleaching agent. However, the Ruthenberg process is typical of electrolytic bleaching process well-known in the art today, and has the disadvantage of requiring the use of chemicals, which adversely affect fiber strength.

The use of an electric field to remove ink from a paper pulp slurry also has been disclosed in the prior art. Bonser, U.S. Pat. No. 1,008,779, discloses a process for removing ink from a paper pulp slurry by subjecting the paper pulp slurry to electrolysis. In the Bonser process, the paper is washed and pulped and then macerated in the presence of a chemical preparation. The pulp is boiled and treated with an acid in water, drained, and then neutralized with an alkaline solution. The neutralized pulp slurry is then subjected to electrolysis. However, the Bonser process uses a common configuration for the electrolysis, both as to how the electric field is applied and the stage during the pulp processing at which the electric field is applied. Additionally, the Bonser process is carried out in a vat-type setup and does not produce paper pulp clean enough or bright enough for many applications.

Krodel et al., U.S. Pat. No. 2,743,178, discloses a process for deinking printed waste paper slurries, particularly low quality paper stock, such as waste newspaper stock, using an electric field. In the Krodel et al. process, the waste paper is shredded and combined with water and a suitable detergent to loosen the ink binder and emulsify the ink particles. A salt is added to charge the ink particles so as to partially separate them from the cellulose. The pulp then is heated and agitated to bring about a greater separation of the ink particles from the cellulose. Finally, an electric field is directed through the suspension to increase the separation of the ink particles from the cellulose. The Krodel et al. process emphasizes the addition to the pulp suspension of a certain type of salt to magnify the differences in electric charges between the fibers and the ink particles, and therefore has the disadvantage of unwanted chemical steps. The design of the Krodel et al. deinking vessel does not include any means for cleaning the electrodes, or for removing the ink from the vessel. Further, the Krodel et al. structure does not allow for the Production of a pulp which is clean enough or bright enough for many applications. In order to achieve such desired cleanness and brightness, the mere application of an electric current through a pulp is not sufficient.

Fujita et al., U.S. Pat. No. 3,835,006, discloses a method of removing ionic substances from a pulp to be used in the production of electrically insulating paper having a superior dielectric dissipation factor. Although the Fujita et al. process uses an electric field to remove certain substances from a pulp, it was not designed for the deinking of waste paper, the main thrust of it being for the removal of some metallic ions from paper sheets. To achieve its purpose, the Fujita et al. method uses large area electrodes and minimal spacing between electrodes, leading to high maintenance and replacement costs due to the inherent corrosion of the electrodes and the natural migration of foreign particles to the electrode surfaces. Additionally, the Fujita et al. process does not appear to be a retrofit useful on existing deinking equipment.

BRIEF SUMMARY OF THE INVENTION

Therefore, there is a need for a process for deinking recycled fibers, such as waste paper, so as to remove a higher percentage of the ink from the paper and simultaneously to bleach and/or brighten the paper pulp so as to result in a cleaner and brighter paper pulp suitable for use in a larger variety of paper applications. It has been found that the efficiency of the deinking process, and the resulting cleanness and brightness of the paper pulp, can be increased significantly by the type, structure and design of the deinking vessel used, including the electrodes used for supplying the electric field and inducing electrolysis, and the addition of various ink removal methods and electrode cleaning methods and apparatuses. It also has been found that it is possible to conduct the deinking process with fewer and less destructive chemicals and with fewer and less destructive mechanical steps.

Accordingly, it is an object of the present invention to provide a method and apparatus for deinking recycled fibers which results in a more efficient dislodgement, removal and separation of the ink from the fiber surfaces and the fiber matrix.

It is another object of the present invention to provide a method and apparatus as discussed above which achieves higher brightness and whiteness values of recycled pulp.

It is a further object of the present invention to provide a method and apparatus as discussed above which is accomplished with a reduction in chemical usage and mechanical steps.

Yet another object of the present invention is to provide a method and apparatus as discussed above which has improved dust removal from the recycled fiber streams.

Still another object of the present invention is to provide a method and apparatus as discussed above which can be retrofitted to existing deinking equipment.

It is still another object of the present invention to provide a method and apparatus as discussed above which comprises flotation action for more efficient separation of the ink from the fibers.

Yet another object of the present invention is to provide a method and apparatus as discussed above which uses induced electrophoresis and electrocoagulation to separate ink particles from the recycled fibers.

Another object of the present invention is to provide a method and apparatus as discussed above which allows for the production of fine gas bubbles during the electrolysis to cause flotation of the separated ink particles and to help improve the brightness of the resulting paper pulp.

An object of the present invention is to provide a method and apparatus as discussed above which incorporates continuous cleaning of the electrodes and removal of dislodged ink particles from the system.

Still another object of the present invention is to provide a method and apparatus as discussed above which is efficient and economical in operation and durable in construction.

A final object of the present invention is to provide a method and apparatus as discussed above which can be operated in batch, semi-continuous and continuous modes.

These and other objects are accomplished by the present method and apparatus, which is an efficient process both in terms of dislodging the ink particles from the fiber surfaces and removing the dislodged particles from the fiber slurry, which utilizes an external fields approach and has a non-chemical and non-mechanical preferred embodiment. The present deinking method and apparatus comprises inherent flotation and bleaching and/or brightening actions, which help achieve more efficient removal of ink and higher brightness levels of pulp, respectively. The incorporation of means for continuously cleaning the process electrodes and removing dislodged ink from the system allows this method and apparatus to be run as a continuous process. Further, the increased efficiency of the present deinking method and apparatus decreases the number of stages necessary for satisfactory deinking and, thereby, the cost of the deinking. By eliminating mechanical and chemical steps, a fiber pulp of higher quality and strength results, allowing for the production of a higher quality and strength recycled paper. The new technology also helps in the removal of dust particles present in the waste paper and can be easily retrofitted to existing commercial equipment.

The method of the present deinking process comprises the step of applying a direct current electric field through a recycled fiber slurry between a positive electrode and a negative electrode. The application of the DC electric field to the recycled fiber slurry leads to electrolysis within the slurry, thus generating gas bubbles including oxygen bubbles. The DC electric field helps to loosen the ink particles from the recycled fiber slurry through electrophoresis and the gas bubbles generated also simulate flotation action which helps suspend the ink particles so that they can be mobilized and coagulated by the electric field through electrocoagulation and/or floated to the open surface by the gas bubbles. In addition, oxygen bubbles generated assist in brightening the pulp and, when the system is operated at temperature and pressure conditions high enough, bleaching the pulp by conventional oxygen bleaching. The present method can be accomplished in batch, semi-continuous, and continuous designs. Further, the inclusion of an agitation step helps to remove the ink particles in a shorter period of time, and the inclusion of a peroxide addition helps to produce a brighter pulp.

The apparatus of the present invention typically comprises one or more deinking units. Each deinking unit comprises a deinking vessel containing an anode and a cathode. The recycle fiber slurry is introduced to the deinking vessel, and an electric field is applied between the anode and the cathode. Each deinking vessel may be a batch, semi-continuous, or continuous flow vessel, any of which can be utilized for a desired situation. The cathode generally is located on or about the periphery of the deinking vessel and the anode generally is located in a central position within the deinking vessel. The anode may be of a variety of configurations designed to achieve the most efficient deinking for various pulp types and desired final product, and to minimize anode corrosion.

Various optional components can be added to the deinking units, such as ink removal scoops or conveyors, slurry agitators, various configurations of anodes and cathodes, and means for cleaning the electrodes. It is desirable to have ink particle removal means in the deinking cell to remove the ink particles separated from the recycled fiber slurry. Such ink particle removal means can be rotating scoops, continuous conveyors or the like. For certain situations it is desirable to have a recycled fiber slurry agitator to assist in the deinking process. The agitator helps shorten the time in which a desired level of deinking can occur or assist in higher levels of deinking to result in cleaner and brighter paper pulp. The various configurations of the anodes and cathodes, and their strategic placement within the deinking vessel, can be chosen for different types of recycled paper slurry and for different levels of deinking. It also is desirable to have a means for cleaning the electrodes as cleaner electrodes result in a more efficient deinking process.

These objects and features, and other objects, features and advantages of the present invention, will become readily apparent to one skilled in the art when the following Detailed Description of the Preferred Embodiments is read in conjunction with the appended figures, in which like reference characters reference to like components throughout the several views.

BRIEF DESCRIPTION OF THE DRAWINGS

FIG. 4A is a top view, partly in section, of an ink removal scoop useful in the present invention.

FIG. 4B is a side view, partly in section, of the ink removal scoop shown in FIG. 4A taken along line B—B.

FIG. 4C is a cross-section of the ink removal scoop shown in FIG. 4A taken along line C—C.

FIG. 4D is a cross-section of the ink removal scoop shown in FIG. 4A taken along line D—D.

FIG. 5A is a second alternate embodiment of the deinking system of the present invention incorporating the agitating impeller shown in FIG. 2E in a semi-continuous process.

DETAILED DESCRIPTION OF THE PREFERRED EMBODIMENT

Recycling of office waste is relatively difficult compared to the recycling of other waste types of paper, such as newsprint, catalogs, and telephone books due to the nature of the ink used in the typical office paper. However, the recycling of office waste is highly desirable due to the demand for recycled office paper, the higher profits for such a recycled paper, and the availability and uniformity of the raw material in the form of the office waste paper. The method and apparatus of the present invention is particularly suited for the deinking of office waste and has achieved results as high as 87% removal of the ink and a significantly lower number of ink specks per recycled sheet when compared to a control sheet. The novelty of this method and apparatus is in the design of the deinking cell and the sequence of stages. Further, the present apparatus can be implemented and practiced in existing mills as it is retrofitted easily to such mills.

The present invention incorporates deinking, flotation, and brightening and/or bleaching operations in a single stage by using a direct current (DC) electric field. Electrophoresis and electrocoagulation are induced by the DC electric field which facilitates better ink removal from the fibers in the paper pulp slurry. Typically, fibers carry a weak negative charge. Ink particles also typically carry charges, varying from high positive to weak negative. The application of a DC electric field across the fiber slurry attracts the ink particles away from the fibers and keeps the ink particles from mixing back into the pulp slurry. The applied DC electric field also helps coagulate the ink particles for easier removal.

The DC electric field also induces electrolysis of water or other liquids in the pulp slurry, creating gas bubbles which cause flotation and bleaching. Flotation action is simulated in the deinking vessel by a strategic design and location of electrodes, and further separates ink from fibers. A bleaching action is simulated by oxygen created during electrolysis along with the electrophoresis, electrocoagulation, and flotation, which provides better brightness and whiteness to the paper pulp. The use of hydrogen peroxide in the process increases the brightness of the resulting pulp. Additionally, dust removal from the recycled fiber streams can be accomplished along with the above actions.

The sequence of steps and the apparatus in which the steps are carried out of the present invention result in an overall cost reduction for deinking paper pulps via a reduction in the chemical usage and the energy required to run mechanical stages, thus reducing or eliminating many environmental problems typical of conventional recycling processes. Further, the reduction in the usage of chemical and mechanical stages results in a reduction in deterioration of the pulp properties, resulting in a stronger recycled paper usable in a wider variety of applications.

Figure 1A:
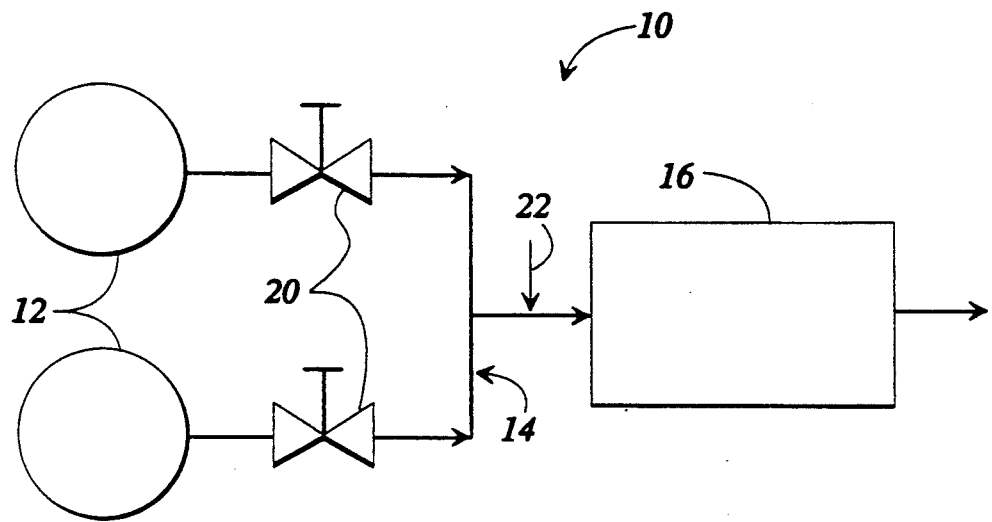
FIG. 1A is a schematic top view of a deinking system according to the present invention.
Figure 1B:
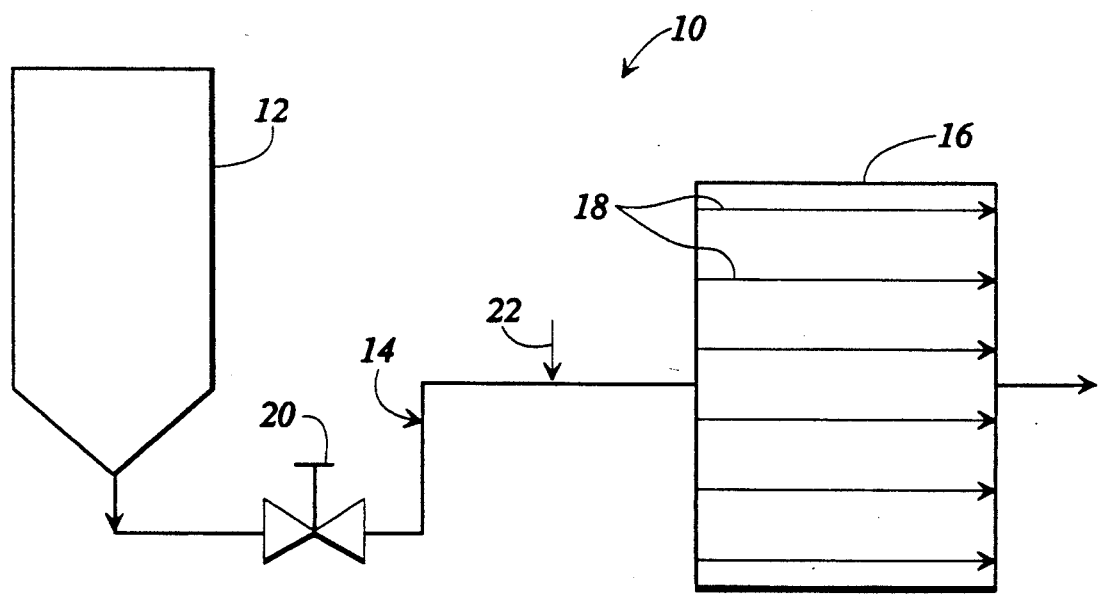
FIG. 1B is a schematic side view of the deinking system shown in FIG. 1A.

Referring now to FIGS. 1A and 1B, the deinking apparatus of the present invention is shown in schematic form. The apparatus, represented generally by the numeral 10, comprises pulp storage tanks 12 in fluid connection via piping 14 with the deinking unit 16. The deinking unit 16 may comprise a bank of deinking cells 18 arranged either in series or in parallel. Pulp stored in the pulp storage tanks 12 is introduced to the deinking unit 16 via piping 14. Valves 20 regulate the flow of the pulp through the system 10 and alternate flow of pulp from pulp storage tanks 12 to the deinking unit 16 such that a constant flow of pulp throughout the system 10 is achieved. Dilution water 22 may be added to the pulp to control its consistency. The pulp slurry may be pretreated in the storage tanks 12 prior to introduction to the deinking cells 18 to remove loose ink particles and gross quantities of ink. Typically an aerator, such as an air bubble generator (not shown), can be installed at the bottom of the storage tanks 12. Air released from the aerator rises through the pulp slurry, agitating the slurry causing loose ink particles to be released from the fibers and carried to the surface. The ink particles can then be removed from the storage tanks by conventional means, or by a scoop as described below, such that a cleaner slurry can be introduced to the system 10, resulting in a cleaner recycled pulp.

Figure 2A:
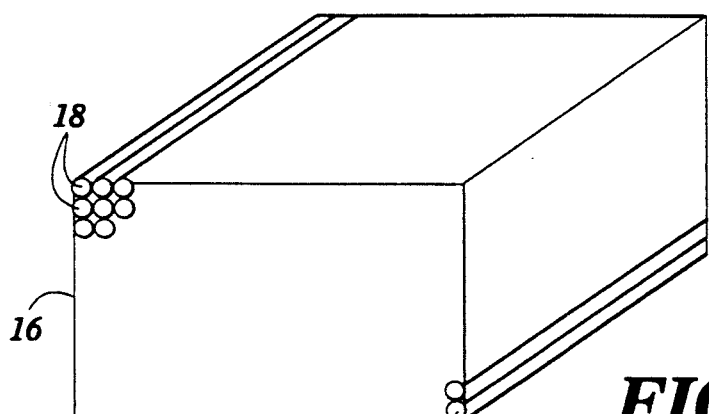
FIG. 2A is an isometric schematic of a bank arrangement of pipes used in the deinking cell shown in FIGS. 1A and 1B.
Figure 6A:
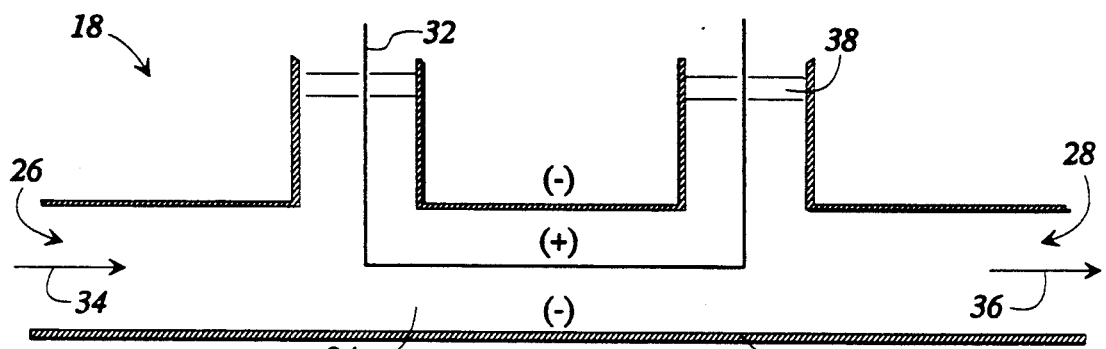
FIG. 6A is a schematic of a continuous flow embodiment of the deinking system of the present invention.

Referring now to FIGS. 2A-2E, various embodiments of the deinking cells 18 are shown. FIG. 2A shows a deinking unit 16 comprising a plurality of continuous flow pipe deinking cells 18. These pipe deinking cells 18 are shown in greater details in FIGS. 6A and 6B. Each cell 18 comprises a deinking region 24, an inflow 26 and an outflow 28. A cathode 30, typically a wire mesh, is located around the interior periphery of the exterior wall of the deinking cell 18. Such a cathode is shown in greater detail in FIGS. 2C, 2D and 2E. Alternatively, the exterior wall defining the deinking region 24 acts as a cathode 30. A wire entering the deinking region 24 acts as the anode 32.

Figure 6B:
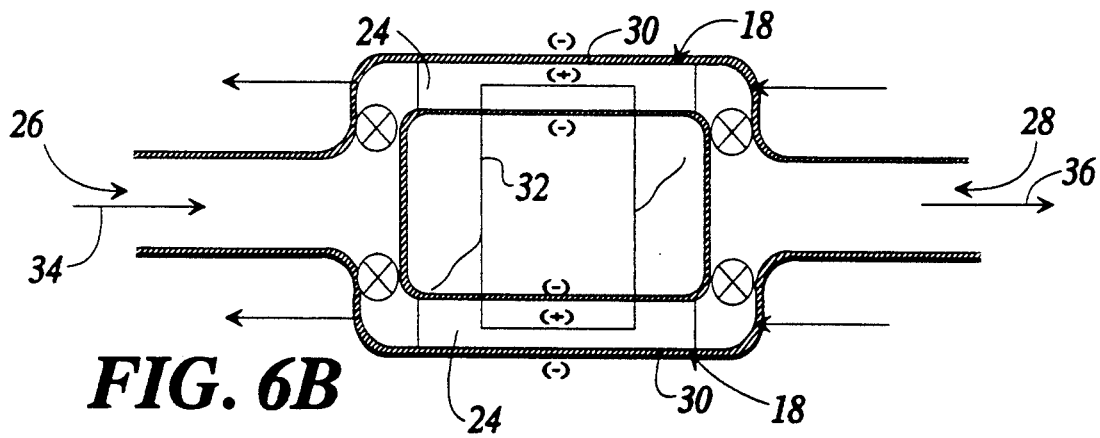
FIG. 6B is a top view of two of the deinking cells shown in FIG. 6A running in parallel.

The raw pulp slurry enters the inflow 26 as represented by arrow 34 and travels into the deinking region 24. Within the deinking region 24, a DC electric field in applied between the anode 32 and the cathode 30 through the pulp slurry. After the pulp slurry has been subjected to the DC electric field and deinking has taken place, it exits the deinking region 24 and the deinking cell 18 via outflow 28 as the cleaned recycled pulp represented by arrow 36. Porous insulation 38 allows the escape of gases generated during the deinking process to avoid an excess build-up of pressure. FIG. 6B shows two pipe deinking cells 18 in a parallel arrangement such that one cell 18a can be used for deinking while the second cell 18b can be flushed or cleaned. Valves 25 allow the pulp to be directed to the appropriate cell 18a, 18b. Water flush, represented by arrows 27a and 27b are used to clean the cells 18a and 18b, respectively.

The deinking unit 16 shown in FIG. 2A is designed for commercial use and comprises a bank arrangement of cells 18 to meet the typical capacity requirement of a recycling plant while satisfying the residence time of pulp in a typical deinking cell 18. The cells 18 either can be arranged horizontally next to each other, vertically on top of each other as shown in FIG. 1B, inclined at any selected angle depending on the space available or residence time necessary, or as a matrix bank as shown in FIG. 2A. An example deinking unit bank for a recycle plant with a production capacity of 1000 oven dried tons (ODT) per day has a bank of 400 deinking units 18 arranged in a 20 unit×20 unit matrix, each deinking unit 18 having a one foot (1') diameter and a twelve foot (12') length. Alternatively, any combination of deinking units 18 equivalent to this bank is acceptable, including a deinking unit 18 having a one foot (1') diameter and a twenty-four hundred foot (2400') length. The reason a bank of 400 1'×12' pipes is used, which is double the length of pipe needed, is such that half of the pipes can function as deinking units 18 while the half undergo cleaning and/or flushing.

Typical pulp is stored in pulp storage tanks 12 at a consistency of from about 8%-15%, that is 8%-15% solids and the rest water or other liquids. The pulp is admitted to the deinking system 10 as shown in FIGS. 1A and 1B. Enough dilution water 22 is added to the pulp to create a pulp having a consistency of from about 0.8%-6%, a desirable consistency at which to carry out the deinking process. At about 6% consistency, about 3.5 ODT of pulp, 58.3 tons including water, will travel through the deinking unit 16. The deinking process typically is carried out at ambient temperature, 20° C.-55° C., and atmospheric pressure. Higher temperatures and pressures will allow oxygen bleaching, as known in the art.

Figure 2B:
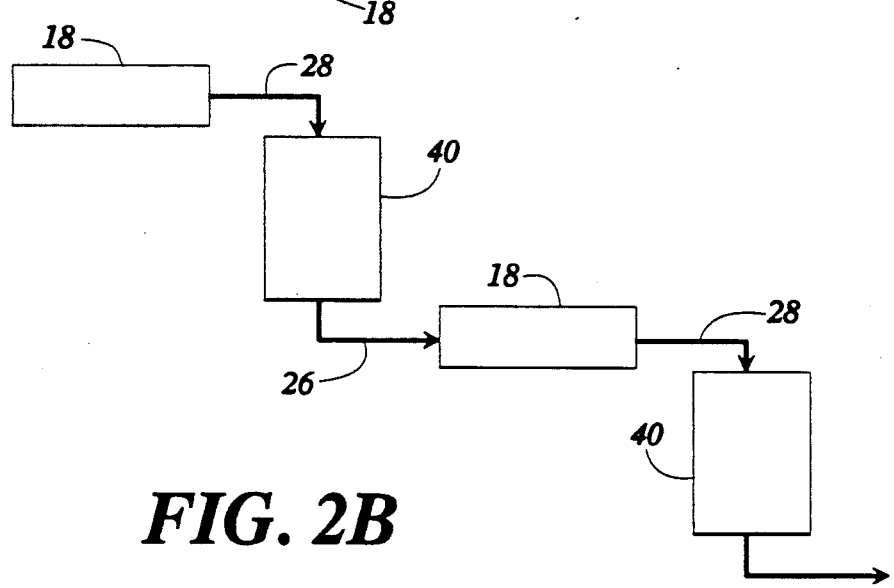
FIG. 2B is a schematic of a series of deinking cells, suitable for use in the present invention.

An alternative embodiment of the deinking unit 16 arrangement is shown in FIG. 2B. This embodiment incorporates a plurality of deinking cells 18 connected in series and comprising mixing vessels 40 following each deinking cell 18. As an alternative, the mixing vessels 40 can be located between a plurality of deinking units 16 comprising a plurality of deinking cells 18 arranged in series, depending upon the plant capacity. Typically within the mixing vessels 40, slow agitation, mechanical vibration, acoustic or ultrasonic field, and/or static mixing are incorporated to assist in dislodging ink particles from the fiber surfaces and to bring the ink particles into the fiber slurry. The dislodged ink particles then are removed from deinking cells 18, as more fully explained later.

Figure 2C:
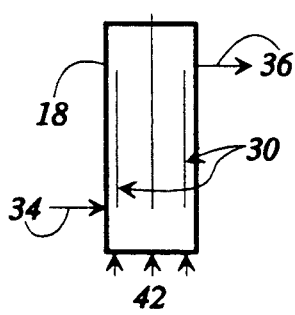
FIG. 2C is a schematic of a vertical deinking cell, suitable for use in the present invention.
Figure 2D:
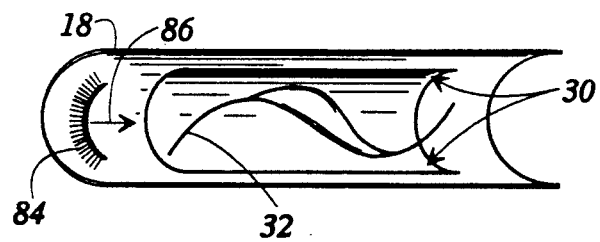
FIG. 2D is an alternate embodiment of the deinking cell of the present invention incorporating a twist anode.
Figure 2E:
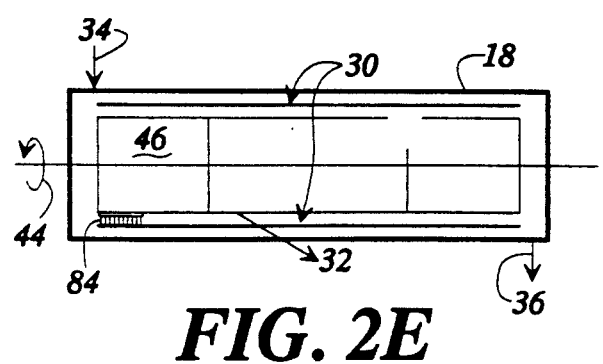
FIG. 2E is another alternate embodiment of the deinking cell of the present invention incorporating a rotary impeller anode in a continuous process.

FIGS. 2C, 2D and 2E show alternative embodiments of the deinking cells 18. The deinking cell 18 shown in FIG. 2C, preferable for the deinking of office waste and other long fiber wastes, is of a vertical design in which the raw pulp 34 enters at the bottom of the cell 18 and exits as clean pulp 26 at the top of the cell 18. An airflow 42 can be incorporated in this vertical design in order to assist the flow of the pulp through the cell 18. The deinking cell shown in FIG. 2D, preferable for the deinking of newspaper, catalog, telephone directory and other short fiber wastes, which is shown in this example as a horizontal cell but also which can be a vertical cell, has an alternative anode 32 cell design. A non-conducting material is helically wound into a screw-shape. Portions of the material, typically the peaks and valleys of the helixes, are made conducting by coating the material with or pasting on the material a conducting metal. The coated or pasted conducting material serves as the anode 32. This anode 32 design serves two functions. First, the design ensures prolonged contact of the pulp with the electrodes in the radial direction. Second, the design acts as a static mixer such that the pulp is better subjected to the electrolysis and more of the ink particles are dislodged from the fiber surfaces. Two or more helical anodes 32 can be used in a consecutive structural configuration to help encourage mixing of a pulp slurry and contact with the electrodes. When two or more helical anodes 32 are used, each anode 32 typically is offset 90° from the previous anode 32, such that the pulp slurry flow coming from one side of a previous anode 32 is split into two parts by the subsequent anode 32. The use of a plurality of such anodes 32 thus helps to achieve significant mixing of the pulp slurry.

FIGS. 2E, 3, and 5a and 5b show embodiments of the deinking cell 18 which comprise dynamic agitation of the pulp slurry in continuous, batch, and semi-continuous processes, respectively. Each of these embodiments are particularly suited for deinking newspaper, catalog, telephone directory and other short fiber wastes. The purpose of these designs is to provide a better mixing of the pulp suspension and to ensure a better exposure of the ink particles to the DC electric field. This is accomplished by the use of an anode agitator 32. The raw pulp 34 enters the deinking cell 18 shown in FIG. 2E and encounters agitating anode 32. Cathodes 30 are located around the periphery of the deinking cell 18. The agitating anode 32 typically comprises a rotary impeller 46. The agitating anode 32 rotates in the direction generally indicated arrow 44. The raw pulp 34, after being subjected to the DC electric field, electrolysis and agitation, exits the deinking cell 18 as cleaned pulp 36.

Figure 3:
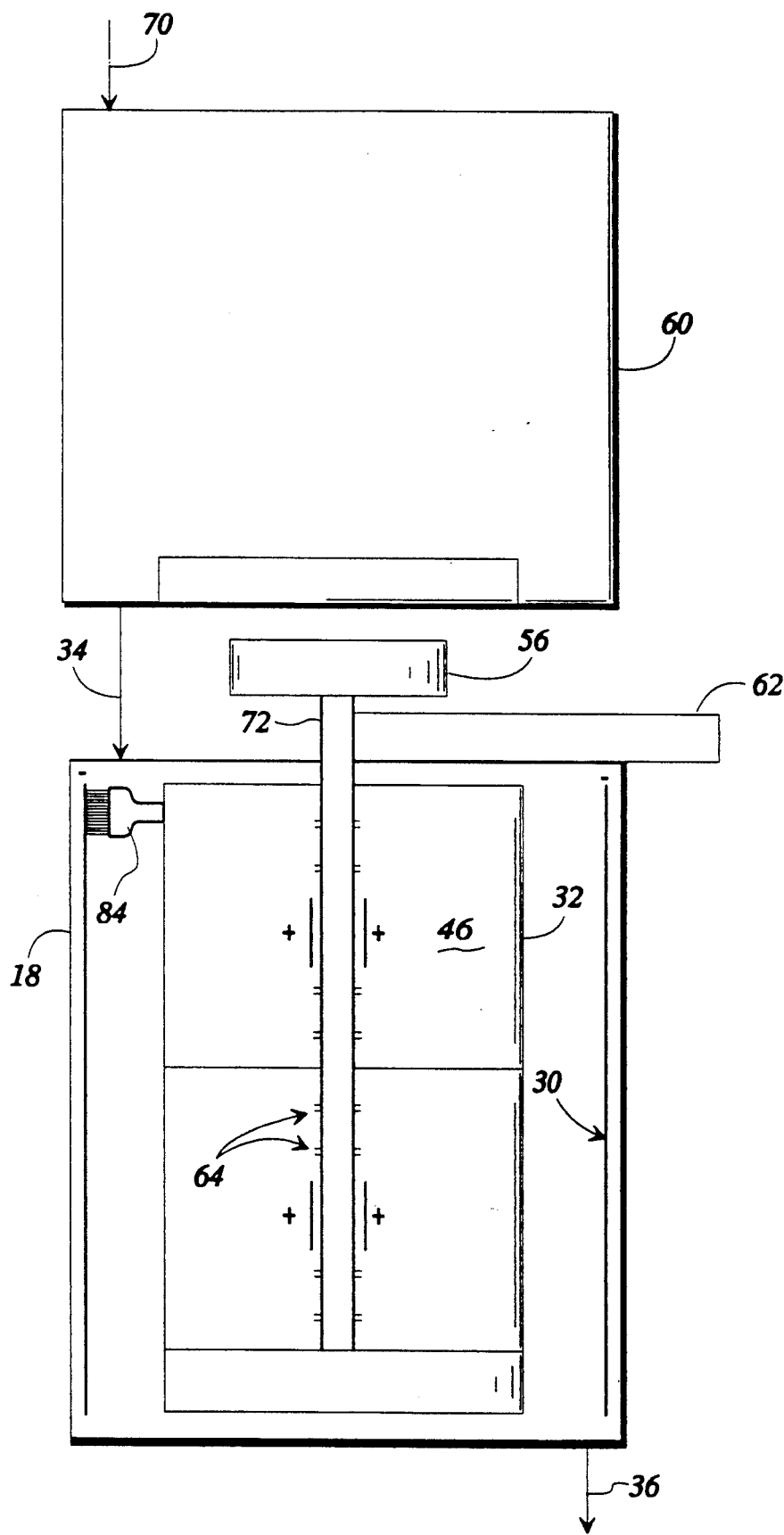
FIG. 3 is an alternate embodiment of the deinking system of the present invention incorporating a vertical deinking cell having an impeller agitator anode in a batch process.

FIG. 3 shows a deinking cell 18 connected directly to a hydrapulper 60. Waste fiber 70, turned into pulp in the hydrapulper 60, is introduced as raw pulp 34 to the deinking cell 18. This particular deinking cell 18 is similar to that of FIG. 2C, but comprising an agitator anode 32 as described above with reference to FIG. 2E. The raw pulp 34 is introduced to the deinking cell 18 where it is subjected to the DC electric field. The particular agitator anode 32 has flush water holes 64 to assist in maintaining the pulp at a proper consistency, and for flushing the anode 46. The ink particles removed from the raw pulp 34 agglomerate and float to the top of the deinking cell 18. As discussed, gas bubbles created during the electrolysis assist in floating ink particles and agglomerated ink particles to the surface of the pulp. The agitator anode 32 is attached to a shaft 72 which is rotated by a motor 56, typically in slow agitation, less than about ten revolutions per minute (10 rpm).

The particular deinking cell 18 shown in FIG. 3 further comprises an ink removal scoop 62 which skims the removed ink which has floated to the top of the pulp in the deinking cell 18. The ink removal scoop 62 is shown in more detail in FIGS. 4A-4D. In a preferred embodiment, the ink removal scoop 62 comprises a retaining wall 64, a skimming wall 60, and an outflow surface 68. In operation, the scoop 62 is attached to the same shaft 72 which connects the motor 56 to the agitating anode 32. Therefore, the scoop 62 travels at the same speed and in the same direction as the agitating anode 32. As the scoop 62 rotates about the top of the deinking cell 18, ink particles floating on the top of the pulp are gathered by the scoop 62 by skimming wall 66. The ink particles are kept from returning to the pulp by retaining wall 64. The slope of outflow surface 68 causes the ink particle to leave the scoop 62, the ink being gathered in a retaining tank, such as ink collection tank 54 shown in FIG. 5A.

Figure 5B:
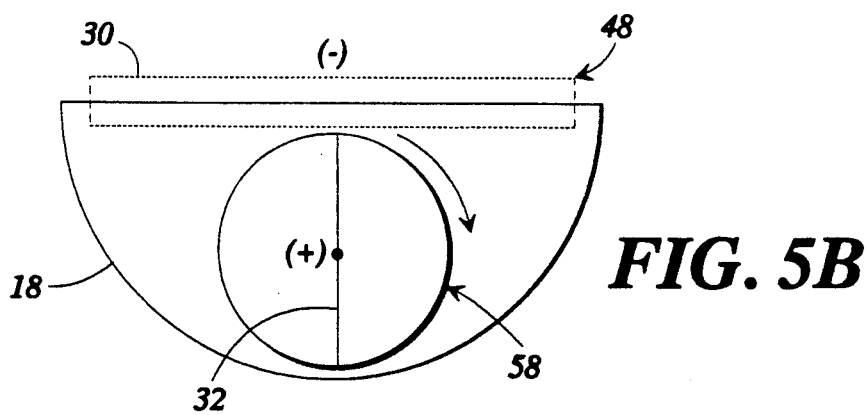
FIG. 5B is a cross section taken along line A—A of FIG. 5A.

The deinking cell 18 shown in FIGS. 5A and 5B comprises an ink removal conveyor system 48 for the removal of the ink from the system 10. The conveyance system 48 comprises a conveyance cathode 30 which both acts as the cathode 30 and through electrostatic attraction removes the ink from the system 10. The conveyance electrode 30 is conveyed in the direction represented by the arrow 74 via rollers 80. Conveyance electrode 30 enters the deinking cell 18 and becomes submerged in the pulp and, thus, completes the electrolysis circuit. As conveyance electrode 30 exits the pulp, the ink removed from the pulp gathers on outer surface 76 of the conveyance electrode 30. After exiting the deinking cell 18, a doctor blade 82 scrapes the outer surface 76 of the conveyance electrode 30 scrapping off the ink as an ink sludge 78 which is gathered in an ink collection tank 52 as removed ink 54. The conveyance electrode 30 then is washed by a water wash 50 before being reintroduced into the deinking cell 18. As shown in FIG. 5B, the agitating anode 32 travels in a generally circular direction indicated by the arrow 58.

The application of the DC electric field to the fiber slurry leads to the electrolysis of the water contained in the slurry. The nascent gas bubbles generated during electrolysis are so small, typically less than about 100 microns, and preferably less than about 10 microns, that they simulate flotation action. The flotation action helps suspend fine ink particles so that they can either be mobilized by the DC electric field or floated to the open surface. In addition, oxygen bubbles liberated during the electrolysis of the water can be utilized for the brightening and the bleaching of the pulp. The temperature and pressure conditions employed during the deinking process can be set high enough to create conventional oxygen bleaching. As is known in the art, oxygen bleaching occurs at a temperature of about 95° C. and pressure of about 100 psig.

Various chemicals can be added to the pulp slurry if desired. The applied DC electric field also will dissociate the deinking chemicals, thus increasing the efficiency of the deinking process, and producing a cleaner and brighter pulp. For example, hydrogen peroxide, the most frequently used brightening agent in recycling process, will dissociate upon electrolysis into:

$$2H_2O_2 \rightarrow 2OOH^- + 2H^+$$

This is the desired dissociation for peroxide, rather than the decomposition step:

$$2H_2O_2 \rightarrow 2H_2O + O_2$$

In addition to the above reaction, the applied direct current electric field also is capable of cleaning the fiber slurry by removing the dust particles which carry negative surface charges.

When the electrode arrangement and the application of a DC electric field as described above are incorporated into a deinking cell 18, the cathode 30 typically is a wire mesh arranged around the periphery of the deinking cell 18 at most about one inch (1") from the wall of the cell 18 and extending into the pulp. The anode 32 typically is a metal rod suspended in the cell touching the pulps suspension. As an alternative, the DC electric field can be pulsed, on and off, rather than continuously on.

During the operation of the system 10, ink particles and other impurities migrate to the cathode 30, thus causing a build-up on the cathode 30. Such a build-up decreases the efficiency of the system 10. Therefore, it has been found to be advantageous to clean the build-up off of the cathode 30 during operation. An electrode cleaning means can be incorporated into the apparatus, and is shown by way of example as cleaning brush 84. As the anode 32 rotates, brush 84 sweeps against the cathode 30, thus dislodging ink particles from the cathode 30, exposing clean cathode area. Although the brush 84 shown in FIGS. 2E and 3 is limited in size, it should be understood that brush 84 can be of any size and configuration necessary to sufficiently clean the cathode 30.

For systems 10 in which mechanical steps are not used, such as systems without rotating anodes 32, brush 84 still can be used. At strategic times during operation, or during cleaning and flushing periods, the stationary anode 32 can be rotated one or more times, just enough to effect a cleaning of cathode 30. Alternatively, brush 84 can be a separate unit which is moved through the deinking cell 18 when necessary to effect cleaning, such as ring-like cleaning brush 84 shown in FIG. 2D. Brush 84 can be pulled through the cell 18 in the direction represented by arrow 86 to effect cleaning.

A presoaking step and stage can be added to the above method and apparatus to initiate the loosening and dislodging of the ink particles from the fibers. Typically, the pulp is presoaked for approximately ten (10)

minutes at approximately room temperature, 20° C.-55° C., and atmospheric pressure. The pulp is kept at approximately 7% consistency and may contain approximately 1%-3%, and preferably 2.5%, sodium hydroxide and approximately 0.5%-1%, fiber. Although many different surfactants are acceptable, ethoxylate surfactants are acceptable and found to give adequate results. After presoaking, the pulp is disintegrated using a conventional disintegrator means. A first disintegration takes place for approximately twenty (20) minutes at approximately 7% pulp consistency. After the first disintegration stage, the pulp is subjected to a flotation stage at approximately 1% consistency for approximately 10 minutes to remove the bulk ink products. The pulp is then subjected to a second disintegration stage for approximately 10 minutes also at approximately 7% consistency. After the second disintegration stage, the pulp is subjected to the instant deinking process. For this particular set up, the pulp is deinked at approximately 1% consistency for approximately 10 minutes. Subsequent to deinking, the pulp is washed and further processed.

The main purpose of this method and apparatus is to provide adequate process and equipment designs for a more efficient continuous deinking process. The method and apparatus are designed to accommodate a DC electric field application in the deinking cells and to provide adequate but economical electrode area. Additionally, it is desirable to minimize the anode area so as to keep the cost of the anode material low. The present method and apparatus facilitate an easy and continuous removal of the ink from the pulp and the removed ink from the deinking system. The instant method and apparatus is suitable for retrofitting to existing mills and also for use as a new installation.

The pulp resulting from the intant method and apparatus is superior to the pulp obtained from the prior art methods and apparatuses. The following tables show the superior characteristics of the pulp obtained from the present invention. Table 1 gives values for the brightness, Table 2 gives values for the ink speck count, Table 3 gives values for the tear index, Table 4 gives values for the tensile index, and Table 5 gives results for the burst index of paper produced from the pulp deinked by the present method and apparatus.

TABLE 1

| | GE Brightness |
|---|---|
| Waste Type | GE Brightness Increase (Points) |
| Old Newsprint (ONP) | 2-3 |
| Old Directory yellow pages Old Catalog | 3-6 |
| Offset printing | 4-6 |
| Gravure printing | 2-3 |

TABLE 2

| | Visual Count of Specks | | |
|---|---|---|---|
| | Number of Specks Per Handsheet | | |
| Waste Type | Control | GT | % Change |
| Old Newsprint Old Directory | 36 | 26 | 28 |
| Yellow Pages | 24 | 18 | 25 |
| White Pages | 21 | 18 | 14 |
| Old Catalog | 42 | 23 | 45 |
| Office Waste | 62 | 8 | 87 |

TABLE 3

| | Tear Index (mN-m$^2$/g) | |
|---|---|---|
| Waste Type | Control | GT |
| Old Newsprint Old Directory | 6.9 | 6.5 |
| Yellow Pages | 6.5 | 7.5 |
| White Pages | 6.1 | 7.2 |
| Old Catalog | 9.9 | 10.9 |
| Office Waste | 6.5 | 6.8 |

TABLE 4

| | Tensile Index (N-m/g) | |
|---|---|---|
| Waste Type | Control | GT |
| Old Newsprint Old Directory | 30.1 | 30.0 |
| Yellow Pages | 32.8 | 37.7 |
| White Pages | 37.9 | 38.8 |
| Old Catalog | 48.6 | 47.0 |
| Office Waste | 29.9 | 34.0 |

TABLE 5

| | Burst Index (kPa-m$^2$/g) | |
|---|---|---|
| Waste Type | Control | GT |
| Old Newsprint Old Directory | 1.5 | 1.4 |
| Yellow Pages | 1.4 | 1.9 |
| White Pages | 1.9 | 1.6 |
| Old Catalog | 2.5 | 2.5 |
| Office Waste | 1.6 | 1.7 |

Figure 7:
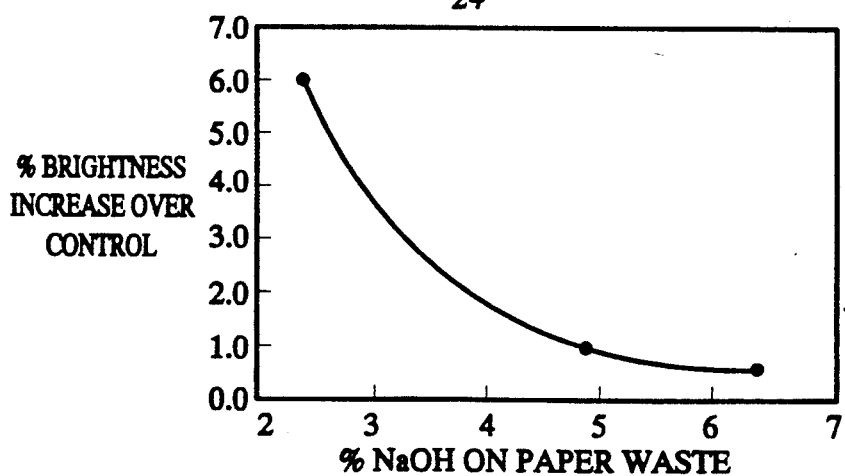
FIG. 7 is a plot of the percent brightness increase over a control versus the percent sodium hydroxide on paper waste showing the reduction in chemical composition using the present invention.

The present method and apparatus, by utilizing less chemicals and mechanical steps, also is more economical. FIG. 7 shows a reduction in the chemical consumption of the deinking process by using the present method and apparatus. As can be seen, the fewer chemicals used, the brighter the resulting paper over the control paper. Additionally, paper produced from recycled pulp deinked by the present method and apparatus shows a significant improvement in brightness and ink removal over prior art. When compared to the paper resulting from the Krodel et al. patent discussed above, the brightness increases indicated in Table 6 are obtained.

TABLE 6

| | Brightness Values | | Change | |
|---|---|---|---|---|
| | Prior to DC Field | After DC Field | Change | % Increase |
| Krodel | | | | |
| Control 1 | 46.0 | 46.2 | 0.2 | 0.435 |
| Control 2 | 50.9 | 51.8 | 0.9 | 1.77 |
| Present | | | | |
| Control 1 | 54.0 | 55.6 | 1.6 | 2.96 |
| Control 2 | 53.2 | 55.2 | 2.0 | 3.76 |

As these test values indicate, the present deinking method and apparatus is superior to the Kodel et al. method due to the innovativeness in how the electric field is applied, at which stage the current is applied, how the ink is removed, and how the deinking unit is designed.

When compared to the Fujita et al. patent discussed above, the present method and apparatus result in a higher ash content removed, thus resulting in a purer product. Table 7 indicates the improvement of the instant method and apparatus.

TABLE 7

| | % Ash Content | | % Reduction |
| --- | --- | --- | --- |
| | Before | After | |
| Fujita | 0.4 | 0.31 | 22.5 |
| Present | 4.5 | 1.4 | 96.9 |

The above Detailed Description of the Preferred Embodiments discloses the best mode of the invention as contemplated by the inventors at this time. As will be obvious to one skilled in the art, there are various alternative embodiments of the present invention which fall within the spirit and scope of the invention as claimed in the below claims.

What is claimed is:

1. A method for deinking recycled fibers, comprising the steps of:
    a. dispersing a fiber pulp in water creating a slurry;
    b. applying a continuous direct current electric field across said slurry to remove ink from said fibers and said slurry;
    c. allowing the ink removed from said fibers and said slurry to float to the surface of said slurry;
    d. removing the ink from the surface of said slurry;
    e. washing said slurry; and
    f. recovering clean, recycled fibers.

2. The method as claimed in claim 1, wherein said slurry is introduced to a deinking cell prior to applying said electric field to said slurry.

3. The method as claimed in claim 2, wherein said slurry is pretreated with water and a gas prior to being introduced to said deinking cell.

4. The method as claimed in claim 1, wherein steps b through e are repeated a plurality of times.

5. The method as claimed in claim 1, wherein said slurry is agitated during one or more of steps b through e.

6. The method as claimed in claim 1, wherein said slurry is forced to travel through a deinking cell in a continuous process, wherein one or more of steps b through d are accomplished within said cell.

7. The method as claimed in claim 1, wherein said slurry is pretreated with at least one chemical prior to applying said electric field to said slurry.

8. The method as claimed in claim 1, wherein at least one chemical is added to said slurry during step b.

9. The method as claimed in claim 8, wherein said at least one chemical is hydrogen peroxide.

10. A method for deinking recycled fibers, comprising the steps of:
    a. dispersing a fiber pulp in water to create a slurry;
    b. adjusting the solids content of said slurry to less than 18% solids by adding or removing water;
    c. introducting said slurry to a deinking cell;
    d. applying a continuous direct current electric field across said slurry within said deinking cell thereby subjecting said slurry to electrolysis to loosen the ink from the fiber pulp and electrophoresis so as to remove ink from said fiber pulp;
    e. allowing the ink removed from said fibers to float to the surface of said slurry;
    f. removing the ink from the surface of said slurry; and
    g. washing the deinked fibers.

11. The method as claimed in claim 10, further comprising pretreating said slurry with a gas prior to introducing said slurry to said deinking cell.

12. The method as claimed in claim 10, further comprising treating said slurry with at least one chemical within said deinking cell.

13. The method as claimed in claim 10, further comprising agitating said slurry during one or more of steps d through f.

14. The method as claimed in claim 10, carried out as a continuous process.

15. The method as claimed in claim 10 carried out as a semi-continuous process.

* * * * *